United States Patent
Breton et al.

(10) Patent No.: US 8,449,095 B2
(45) Date of Patent: *May 28, 2013

(54) RADIATION CURABLE SOLID INK COMPOSITIONS SUITABLE FOR TRANSFUSE PRINTING APPLICATIONS

(75) Inventors: Marcel P. Breton, Mississauga (CA); Michelle N. Chretien, Mississauga (CA); Christopher A. Wagner, Etobicoke (CA); Ian R. Duffy, Richmond (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 100 days.

This patent is subject to a terminal disclaimer.

(21) Appl. No.: 12/835,198

(22) Filed: Jul. 13, 2010

(65) Prior Publication Data

US 2012/0013690 A1    Jan. 19, 2012

(51) Int. Cl.
*C09D 11/12* (2006.01)
*C09D 11/00* (2006.01)
*C09D 11/10* (2006.01)

(52) U.S. Cl.
CPC ............ *C09D 11/34* (2013.01); *C09D 11/101* (2013.01)
USPC ............ 347/99; 347/88; 347/102; 106/31.61

(58) Field of Classification Search
USPC ................ 347/88, 99, 102; 106/31.29, 31.3, 106/31.61, 31.62
See application file for complete search history.

(56) References Cited

U.S. PATENT DOCUMENTS

| | | |
|---|---|---|
| 3,653,932 A | 4/1972 | Berry et al. |
| 4,167,503 A | 9/1979 | Cipriani |
| 4,390,369 A | 6/1983 | Merritt et al. |
| 4,484,948 A | 11/1984 | Merritt et al. |
| 4,684,956 A | 8/1987 | Ball |
| 4,851,045 A * | 7/1989 | Taniguchi ............... 106/31.31 |
| 4,889,560 A | 12/1989 | Jaeger et al. |
| 4,889,761 A | 12/1989 | Titterington et al. |
| 5,006,170 A | 4/1991 | Schwarz et al. |
| 5,151,120 A | 9/1992 | You et al. |
| 5,221,335 A | 6/1993 | Williams et al. |
| 5,231,135 A | 7/1993 | Machell et al. |
| 5,372,852 A | 12/1994 | Titterington et al. |
| 5,389,958 A | 2/1995 | Bui et al. |
| 5,496,879 A | 3/1996 | Griebel et al. |
| 5,621,022 A | 4/1997 | Jaeger et al. |
| 5,804,671 A | 9/1998 | Dones et al. |
| 5,889,076 A | 3/1999 | Dones et al. |
| 6,221,137 B1 | 4/2001 | King et al. |
| 6,239,189 B1 | 5/2001 | Narayan et al. |
| 6,316,517 B1 | 11/2001 | Dones et al. |
| 6,467,897 B1 | 10/2002 | Wu et al. |
| 6,472,523 B1 | 10/2002 | Banning et al. |
| 6,476,219 B1 | 11/2002 | Duff et al. |
| 6,576,747 B1 | 6/2003 | Carlini et al. |
| 6,576,748 B1 | 6/2003 | Carlini et al. |
| 6,586,492 B1 | 7/2003 | Caiger et al. |
| 6,590,082 B1 | 7/2003 | Banning et al. |
| 6,646,111 B1 | 11/2003 | Carlini et al. |
| 6,663,703 B1 | 12/2003 | Wu et al. |
| 6,673,139 B1 | 1/2004 | Wu et al. |
| 6,696,552 B2 | 2/2004 | Mayo et al. |
| 6,713,614 B2 | 3/2004 | Carlini et al. |
| 6,726,755 B2 | 4/2004 | Titterington et al. |
| 6,755,902 B2 | 6/2004 | Banning et al. |
| 6,821,327 B2 | 11/2004 | Jaeger et al. |
| 6,896,937 B2 | 5/2005 | Woudenberg |
| 6,958,406 B2 | 10/2005 | Banning et al. |
| 7,053,227 B2 | 5/2006 | Jaeger et al. |
| 7,276,614 B2 | 10/2007 | Toma et al. |
| 7,279,506 B2 | 10/2007 | Sisler et al. |
| 7,279,587 B2 | 10/2007 | Odell et al. |
| 7,322,688 B2 | 1/2008 | Woudenberg |
| 7,381,831 B1 | 6/2008 | Banning et al. |
| 7,427,323 B1 | 9/2008 | Birau et al. |
| 7,559,639 B2 | 7/2009 | Belelie et al. |
| 2003/0036587 A1 | 2/2003 | Kozak |
| 2006/0122354 A1 | 6/2006 | Carlini et al. |
| 2006/0132570 A1 | 6/2006 | Odell et al. |
| 2007/0012217 A1 | 1/2007 | Goredema et al. |
| 2007/0119337 A1 | 5/2007 | Breton et al. |
| 2007/0119338 A1 | 5/2007 | Breton et al. |
| 2007/0119339 A1 | 5/2007 | Kovacs et al. |
| 2007/0119340 A1 | 5/2007 | Breton et al. |
| 2007/0120908 A1 | 5/2007 | Odell et al. |
| 2007/0120909 A1 | 5/2007 | Belelie et al. |
| 2007/0120910 A1 | 5/2007 | Odell et al. |
| 2007/0120919 A1 | 5/2007 | Goredema et al. |
| 2007/0120921 A1 | 5/2007 | Carlini et al. |
| 2007/0120922 A1 * | 5/2007 | Belelie et al. .............. 347/100 |
| 2007/0120923 A1 | 5/2007 | Kovacs et al. |
| 2007/0120924 A1 * | 5/2007 | Odell et al. .............. 347/100 |

(Continued)

OTHER PUBLICATIONS

Mar. 8, 2011 Office Action issued in U.S. Appl. No. 12/642,569.
Dec. 16, 2011 Office Action issued in U.S. Appl. No. 12/642,569.
May 10, 2012 Office Action issued in Canadian Patent Application No. 2,725,030.
Dec. 18, 2009 U.S. Patent Application filed under U.S. Appl. No. 12/642,538.
Dec. 18, 2009 U.S. Patent Application filed under U.S. Appl. No. 12/642,569.
"Dimer Acids," Kirk-Othmer Encyclopedia of Chemical Technology, vol. 8, 4th Ed. (1992), pp. 223-237.

(Continued)

*Primary Examiner* — Matthew Luu
*Assistant Examiner* — Rut Patel
(74) *Attorney, Agent, or Firm* — Oliff & Berridge, PLC

(57) ABSTRACT

This disclosure is generally directed to curable solid inks, such as radiation-curable solid inks, and their use in forming images, such as through transfuse printing. More specifically, this disclosure is directed to radiation-curable solid inks, such as ultraviolet-light-curable phase-change inks, that comprise curable and non-curable waxes.

20 Claims, No Drawings

U.S. PATENT DOCUMENTS

| | | |
|---|---|---|
| 2007/0120925 A1* | 5/2007 | Belelie et al. ................. 347/100 |
| 2007/0123601 A1 | 5/2007 | Belelie et al. |
| 2007/0123606 A1 | 5/2007 | Toma et al. |
| 2007/0123641 A1 | 5/2007 | Belelie et al. |
| 2007/0123642 A1 | 5/2007 | Banning et al. |
| 2007/0123663 A1 | 5/2007 | Toma et al. |
| 2007/0123722 A1 | 5/2007 | Toma et al. |
| 2007/0123723 A1 | 5/2007 | Odell et al. |
| 2007/0123724 A1 | 5/2007 | Belelie et al. |
| 2008/0000384 A1* | 1/2008 | Belelie et al. .............. 106/31.13 |
| 2008/0098929 A1* | 5/2008 | Turek et al. ................. 106/31.29 |
| 2009/0046134 A1 | 2/2009 | Belelie et al. |
| 2009/0234041 A1 | 9/2009 | Belelie et al. |
| 2009/0258155 A1 | 10/2009 | Odell et al. |
| 2011/0152397 A1 | 6/2011 | Breton et al. |

* cited by examiner

US 8,449,095 B2

RADIATION CURABLE SOLID INK COMPOSITIONS SUITABLE FOR TRANSFUSE PRINTING APPLICATIONS

BACKGROUND

This disclosure is generally directed to radiation curable solid inks, and their use in forming images, such as through transfuse printing. More specifically, this disclosure is directed to radiation-curable solid inks, such as low-shrinkage radiation curable solid inks, that comprise solid monomers and a reactive wax.

Transfuse printing systems are known in the art, and thus extensive description of such devices is not required herein. Solid inks (also referred to as phase change or "hot melt" inks) are desirable for transfuse printing systems because they remain in a solid phase at room temperature during shipping, long-term storage, and the like. In addition, the problems associated with nozzle clogging as a result of ink evaporation with liquid ink jet inks are largely eliminated, thereby improving the reliability of the transfuse printing.

Solid inks typically used with transfuse printing systems have a wax-based ink vehicle, for example, a crystalline wax-based ink vehicle. Such solid inks provide vivid color images. In typical systems, the crystalline-wax inks are jetted onto a transfer member, for example, an aluminum drum, at temperatures of approximately 120 to about 140° C. The wax-based inks are heated to such high temperatures to decrease their viscosity for efficient and proper jetting onto the transfer member. The transfer member is typically at a temperature of about 60° C., so that the wax will cool sufficiently to solidify or crystallize. As the transfer member rolls over the recording medium, for example paper, the image comprised of wax-based ink is pressed into the paper.

While currently available ink compositions are suitable for their intended purposes, a need remains for a new type of solid ink that is capable of being printed via the piezoelectric transfuse printing process. There is further a need for ink compositions that can be processed at lower temperatures and with lower energy consumption, have improved robustness, have improved jetting reliability and latitude. In addition, a need remains for a new type of solid ink composition that exhibits desirably low viscosity values at jetting temperatures, generates images with improved look and feel characteristics, generates images with improved hardness and toughness characteristics, and that is suitable for a number of commonly used substrates. There is further a need for a solid ink composition that can ensure, to the extent that toxic or otherwise hazardous compounds are used in such compositions, that migration, evaporation or extraction of such materials from this new type of ink be controlled or ameliorated. When used in certain applications, for example food packaging, it is desirable to reduce the amount of or eliminate altogether extractable species present, for example to meet environmental, health and safety requirements.

The present disclosure, in embodiments, addresses one or more of these needs by providing a radiation curable solid ink composition comprising blends of waxes, resins, monomers, curable waxes, pigments and free-radical photoinitiators.

SUMMARY

In embodiments, disclosed herein is a radiation curable solid ink composition, the ink composition comprising an ink vehicle, a curable wax and a non-curable wax, wherein the radiation curable solid ink has a pre-cure or initial hardness as measured by a PTC Durometer greater than 40 at room temperature (approximately 25° C.). The pre- and post-cure hardness of the ink vehicle candidates were obtained with a PTC Durometer Model PS 6400-0-29001 utilizing a Model 476 Stand and with standard 1 Kg load.

Also disclosed are methods of forming an image on a substrate comprising jetting a radiation curable solid ink composition onto a transfuse member and transferring the radiation curable solid ink composition to the substrate and curing the ink composition with radiation, the ink composition comprising an ink vehicle and a curable wax, wherein the radiation curable solid ink has a pre-cure or initial hardness greater than 40 at room temperature.

In embodiments, disclosed is an ink printing device comprising: a radiation curable solid ink composition for printing onto a substrate, an ink jetting device, a transfuse member and a radiation curing device which cures the radiation curable ink, wherein the ink composition comprises an ink vehicle and a curable wax, and wherein the radiation curable solid ink has a pre-cure or initial hardness greater than 40 at room temperature.

In embodiments, disclosed are radiation curable solid inks having low viscosities, jetting temperatures and transfuse temperatures.

EMBODIMENTS

This disclosure is not limited to particular embodiments described herein, and some components and processes may be varied by one of ordinary skill, based on this disclosure.

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The term "functional group" refers, for example, to a group of atoms arranged in a way that determines the chemical properties of the group and the molecule to which it is attached. Examples of functional groups include halogen atoms, hydroxyl groups, carboxylic acid groups and the like.

The term "long-chain" refers, for example, to hydrocarbon chains $(CH_2)_n$, in which n represents the number of carbon atoms in the chain and wherein n is a number of from about 8 to about 60, such as from about 20 to about 45 or from about 30 to about 40. The term "short-chain" refers, for example, to hydrocarbon chains in which n represents the number of carbon atoms in the chain and wherein n is a number of from about 1 to about 7, such as from about 2 to about 5 or from about 3 to about 4.

The term "curable" describes, for example, a material that may be cured via polymerization, including for example free radical routes, and/or in which polymerization is photoinitiated though use of a radiation-sensitive photoinitiator. The term "radiation-curable" refers, for example, to all forms of curing upon exposure to a radiation source, including light and heat sources and including in the presence or absence of initiators. Exemplary radiation-curing techniques include, but are not limited to, curing using ultraviolet (UV) light, for example having a wavelength of 200-400 nm or more rarely visible light, optionally in the presence of photoinitiators and/or sensitizers, curing using electron-beam radiation, optionally in the absence of photoinitiators, curing using thermal curing, in the presence or absence of high-temperature thermal initiators (and which may be largely inactive at the jetting temperature), and appropriate combinations thereof.

As used herein, the term "viscosity" refers to a complex viscosity, which is the typical measurement provided by a mechanical rheometer that is capable of subjecting a sample to a steady shear strain or a small amplitude sinusoidal deformation. In this type of instrument, the shear strain is applied by the operator to the motor and the sample deformation (torque) is measured by the transducer. Examples of such instruments are the Rheometrics Fluid Rheometer RFS3 or the ARES mechanical spectrometer, both made by Rheometrics, a division of TA Instruments. Alternatively, a controlled-stress instrument, where the shear stress is applied and the resultant strain is measured, may be used. Examples of such instruments are the majority of the current rheometers, the main manufacturers being Anton Parr GmbH, Bohlin Instruments, a division of Malvern Instruments, ATS Rheosystems and TA Instruments. Such a rheometer provides a periodic measurement of viscosity at various plate rotation frequencies, co, rather than the transient measurement of, for instance, a capillary viscometer. The reciprocating plate rheometer is able to measure both the in phase and out of phase fluid response to stress or displacement. The complex viscosity, $\eta^*$, is defined as $\eta^* = \eta' - i\eta''$; where $\eta' = G''/\omega$, $G'/\omega$ and $i$ is $\sqrt{-1}$. Alternatively a viscometer that can measure only the transient measurement of, for instance, a capillary or shear viscosity, such as those made by Brookfield Engineering Laboratories or Cannon Instrument Company can also be used.

"Optional" or "optionally" refer, for example, to instances in which subsequently described circumstance may or may not occur, and include instances in which the circumstance occurs and instances in which the circumstance does not occur.

The terms "one or more" and "at least one" refer, for example, to instances in which one of the subsequently described circumstances occurs, and to instances in which more than one of the subsequently described circumstances occurs.

Exemplary ink compositions provide superior print quality while meeting the requirements of transfuse printing processes. An exemplary ink composition includes an ink vehicle and a curable wax, wherein the hardness of the ink composition is greater than 40 at room temperature. In particular, exemplary ink compositions comprise an ink vehicle that includes waxes, resins, monomers, curable waxes and free-radical photoinitiators. Additionally, in exemplary ink compositions, the components of the ink vehicle are solid with little or no odor at 40° C. Exemplary methods of preparing such ink compositions and exemplary methods of using such ink compositions are also described.

In embodiments, the ink composition is a solid at room temperature. In embodiments the radiation curable solid curable ink compositions have a viscosity of about 11 cPs, for example from about 9 cPs, to about 15 cPs, at the temperature of jetting. In particular embodiments, the ink compositions are jetted at temperatures of less than about 100° C., such as from about 60° C. to about 100° C., or from about 70° C. to about 95° C., such as from about 80° C. to about 90° C., such as about 85° C.

In embodiments, the inks can be formulated with an initial hardness greater than about 40 at room temperature (about 25° C.), such as from about 30 to about 70, from about 50 to about 60, or about 55. The present solid ink compositions can be photochemically cured with high efficiency even at room temperature to form images with excellent smear resistance and with hardness after curing that is greater than currently available solid inks. Further, the contraction of the ink from jetting temperature to room temperature is less than about 6.5%, such as less than 4.0%, less than 3.0%, less than 1.5% and less than 1.0%. These contraction rates are at least a 50% improvement over solid ink compositions that use crystalline waxes.

One advantage to the solid radiation curable ink composition disclosed is the reduced jetting, curing and transfuse temperatures as compared to previous, standard hot-melt inkjet inks. Another advantage to the solid radiation curable ink composition disclosed is its reduced contraction over standard hot-melt inks. Standard hot-melt inkjet inks must be jetted at very high temperatures, whereas the presently disclosed solid ink compositions may be jetted at temperatures of about 100° C. or below and solid at temperatures of about 40° C. or less, as discussed previously and below.

Another advantage to the radiation curable solid ink composition disclosed is that the ability to transfuse at temperatures from about 25° C. to about 70° C., such as from about 45° C. to about 65° C., or at about 55° C.

Curable Waxes

Curable waxes for use in the radiation curable solid ink compositions include radiation curable materials that are solids at room temperature and have one or more unsaturated functional groups therein, such as one or more alkene, alkyne, acrylate or methacrylate reactive groups. In embodiments the curable waxes are low molecular weight curable waxes. As used herein, the term low molecular weight refers to compounds having a weight average molecular weight of about 500 g/mol or less, such as about 150 to about 450 g/mol or from about 200 to about 400 g/mol.

In embodiments, the curable wax is an alkyl acrylate, aryl acrylate, alkylaryl acrylate, aryl alkyl acrylate, alkyl methacrylate, aryl methacrylate, alkylaryl methacrylate, aryl alkyl methacrylate.

Exemplary unsaturated monomers for use as curable waxes include, for example, the following monomers and their mixtures: octadecyl methacrylate, octadecyl acrylate, lauryl methacrylate, lauryl acrylate, behenyl acrylate, behenyl methacrylate, cyclohexane dimethanol diacrylate hydroxyoctadecyl acrylate, hydroxyoctadecyl methacrylate, hydroxylauryl methacrylate, hydroxylauryl acrylate, phenethylacrylate, phenethyl methacrylate, 6-phenylhexyl acrylate, 6-phenylhexyl methacrylate, phenyllauryl acrylate, phenyllaurylmethacrylate, 3-nitrophenyl-6-hexyl methacrylate, 3-nitrophenyl-18-octadecyl acrylate, acrylatevinyl octyl ketone, heptafluorobutyl methacrylate vinyl naphthalene, vinyl anthracene, vinyl pyrene, vinylbiphenyl, aminoethylphenyl acrylate, allyl methacrylate, allyl acrylate, undecenyl acrylate, undecenyl methacrylate; dienes which are solid at room temperature; esters of saturated glycols or diols with unsaturated monocarboxylic acids and polyfunctional aromatic compounds such as divinylbenzene.

Examples of suitable curable waxes may include those that are functionalized with curable groups. The curable groups may include, but are not limited to, acrylate, methacrylate, alkene, vinyl and allylic ether. These waxes may be synthesized by the reaction of a wax equipped with a transformable functional group, such as carboxylic and hydroxyl. In embodiments, the curable waxes may be a hydroxyl-terminated polyethylene waxes. Exemplary hydroxyl-terminated polyethylene waxes include mixtures of long chain hydrocarbons with the structure CH3-(CH2)n-CH2OH, where there is a mixture of chain lengths, n. In embodiments the carbon chain has about 16 to about 50 carbons. In embodiments, the curable wax includes linear low molecular weight polyethylene, having the above chain length. Exemplary waxes include, but are not limited to, UNILIN® 350, UNILIN® 425, UNILIN® 550 and UNILIN® 700 with Mn approximately equal to 375, 460, 550 and 700 g/mol, respectively, available from Baker-Petrolite. Guerbet alcohols, characterized as 2,2-dialkyl-1-ethanols, are also suitable compounds. Exemplary Guerbet alcohols include those containing 16 to 36 carbons, available from Jarchem Industries Inc., Newark, N.J. In embodiments, PRIPOL® 2033 is selected, PRIPOL® 2033 being a C-36 dimer diol mixture including isomers of the formula

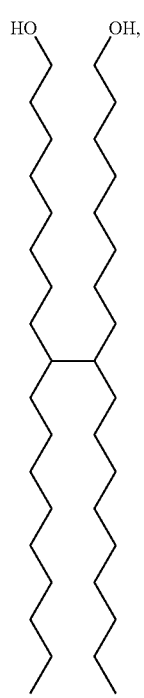 [SMILES: CCCCCCCCCC(CCCCCCCCO)C(CCCCCCCCC)CCCCCCCCO]

as well as other branched isomers which may be unsaturated and cyclic groups, available from Uniqema, New Castle, Del.

These alcohols can be reacted with carboxylic acids equipped with UV curable moieties to form reactive esters. Examples of these acids include, but are not limited to, acrylic and methacrylic acids, available from Sigma-Aldrich Co. Specific curable monomers include acrylates of UNILIN® 350, UNILIN® 425, UNILIN® 550 and UNILIN® 700.

In embodiments, the curable waxes may be carboxylic acid-terminated polyethylene waxes. Exemplary carboxylic acid-terminated polyethylene waxes that may be functionalized with a curable group include, but are not limited to, mixtures of long chain hydrocarbons with the structure CH3-(CH2)n-COOH, where there is a mixture of chain lengths, n. In embodiments the carbon chain has about 16 to about 50 carbons. In embodiments the curable wax includes linear low molecular weight polyethylene, having the above chain length. Examples of such waxes include, but are not limited to, UNICID® 350, UNICID® 425, UNICID® 550 and UNICID® 700 with Mn equal to approximately 390, 475, 565 and 720 g/mol, respectively. Other exemplary waxes have a structure CH3-(CH2)n-COOH, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-diallyl ethanoic acids, are also suitable compounds. Exemplary Guerbet acids include those containing 16 to 36 carbons, many of which are commercially available from Jarchem Industries Inc., Newark, N.J. PRIPOL® 1009 (C-36 dimer acid mixture including isomers of the formula

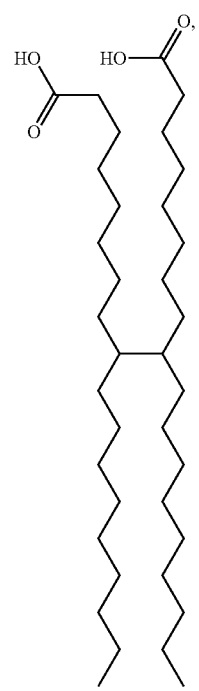

as well as other branched isomers which may include unsaturated and cyclic groups, available from Uniqema, New Castle, Del.

These carboxylic acids can be reacted with alcohols equipped with UV curable moieties to form reactive esters. Examples of these alcohols include, but are not limited to, 2-allyloxyethanol from Sigma-Aldrich Co.;

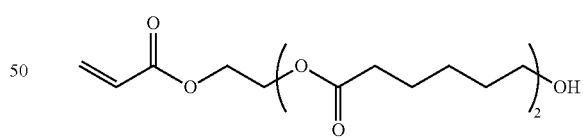

SR495B® from Sartomer Company, Inc.;

TONE® M-101 (R=H, navg=1), TONE® M-100 (R=H, navg=2) and TONE® M-201 (R=Me, navg=1) from The Dow Chemical Company; and

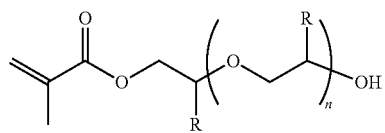

CD572® (R=H, n=10) and SR604® (R=Me, n=4) from Sartomer Company, Inc. In embodiments, the curable wax is a curable acrylate wax having a melting point of from about 50 to about 90° C.

In embodiments, the curable wax is Unilin® 350 acrylate a curable acrylate wax (C22, C23, C24 mixture, melting point about 50 to about 90° C.) available from Baker Hughes, Inc. Synthesis of Unilin® 350 curable acrylate wax is described in U.S. Pat. No. 7,559,639, which is hereby incorporated by reference herein in its entirety.

The radiation-curable solid ink compositions of embodiments may include one or more curable wax in an amount ranging from about 1 percent to about 40 percent by weight, such as from about 2 percent to about 30 percent by weight, or from about 3 percent to about 20 percent by weight, relative to the total weight of the ink vehicle.

Radiation-Curable Co-Monomers

In embodiments, the ink vehicle may include one or more co-monomers. The co-monomers may be chosen from any suitable radiation curable monomers.

Examples of the at least one curable monomer of the composition include propoxylated neopentyl glycol diacrylate (such as SR-9003 from Sartomer), diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, isobornyl (meth)acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, mixtures thereof and the like. As relatively non-polar monomers, mention may be made of isodecyl(meth)acrylate, caprolactone acrylate, 2-phenoxyethyl acrylate, isooctyl (meth)acrylate, and butyl acrylate. In addition, multifunctional acrylate monomers/oligomers may be used not only as reactive diluents, but also as materials that can increase the cross-link density of the cured image, thereby enhancing the toughness of the cured images.

The term "curable monomer" is also intended to encompass curable oligomers, which may also be used in the composition. Examples of suitable radiation curable oligomers that may be used in the compositions have a low viscosity, for example, from about 50 cPs to about 10,000 cPs, such as from about 75 cPs to about 7,500 cPs or from about 100 cPs to about 5,000 cPs. Examples of such oligomers may include CN549, CN131, CN131B, CN2285, CN 3100, CN3105, CN132, CN133, CN 132, available from Sartomer Company, Inc., Exeter, Pa., Ebecryl 140, Ebecryl 1140, Ebecryl 40, Ebecryl 3200, Ebecryl 3201, Ebecryl 3212, available from Cytec Industries Inc, Smyrna GA, PHOTOMER 3660, PHOTOMER 5006F, PHOTOMER 5429, PHOTOMER 5429F, available from Cognis Corporation, Cincinnati, Ohio, LAROMER PO 33F, LAROMER PO 43F, LAROMER PO 94F, LAROMER UO 35D, LAROMER PA 9039V, LAROMER PO 9026V, LAROMER 8996, LAROMER 8765, LAROMER 8986, available from BASF Corporation, Florham Park, N.J., and the like. As multifunctional acrylates and methacrylates, mention may also be made of pentaerythritol tetra(meth)acrylate, 1,2 ethylene glycol di(meth)acrylate, 1,6 hexanediol di(meth)acrylate, 1,12-dodecanol di(meth)acrylate, tris(2-hydroxy ethyl) isocyanurate triacrylate, propoxylated neopentyl glycol diacrylate, hexanediol diacrylate, tripropylene glycol diacrylate, dipropylene glycol diacrylate, amine-modified polyether acrylates (available as PO 83 F, LR 8869, and/or LR 8889 (all available from BASF Corporation)), trimethylolpropane triacrylate, glycerol propoxylate triacrylate, dipentaerythritol penta-/hexa-acrylate, ethoxylated pentaerythritol tetraacrylate (available from Sartomer Co. Inc. as SR 494), and the like.

In embodiments, the co-monomers may be chosen from short-chain alkyl glycol diacrylates or ether diacrylates, such as propoxylated neopentyl glycol diacrylate, and the non-fluorescent co-monomer may be chosen from acrylates having short-chain alkyl ester substituents, such as caprolactone acrylate, and the commercially available products CD536, CD 2777, CD585 and CD586 (available from Sartomer Co. Inc.).

In embodiments, the co-monomers may be a difunctional cycloaliphatic acrylate monomer, a trifunctional monomer, an acrylate ester, or a mixture or combination thereof. In embodiments, the co-monomer can be CD-406®, a difunctional cycloaliphatic acrylate monomer (cyclohexane dimethanol diacrylate, melting point about 78° C.) available from Sartomer Company, Inc., SR368®, a trifunctional monomer (tris(2-hydroxy ethyl) isocyanurate triacrylate, melting point about 50 to about 55° C.) available from Sartomer Company, Inc., CD587® an acrylate ester (melting point about 55° C.) Sartomer Company, Inc., or a mixture or combination thereof.

The radiation-curable solid ink compositions of embodiments may include one or more co-monomers in an amount ranging from about 20 percent to about 90 percent by weight, such as from about 30 percent to about 80 percent by weight, or from about 40 percent to about 70 percent by weight, relative to the total weight of the ink vehicle.

Non-Curable Wax

The non-curable wax may be any suitable non-curable wax that is solid at room temperature. By non-curable, it is meant that the component does not react via free radical polymerization or is not radiation curable or not significantly radiation curable. In embodiments, the non-curable wax can be a member of the group consisting of acid waxes esterified with mono or polyvalent alcohols or blends of acid waxes having different degrees of esterification, and combinations thereof.

In embodiments, the non-curable wax is an ester wax. In other embodiments, the non-curable wax is a derivative of montan wax. In an embodiment, the non-curable wax is Lica-Wax® KFO, an ester wax available from Clariant.

In embodiments, the compositions contain a non-curable wax in combination with an ester wax wherein the ester wax has an acid value (mg KOH/g) that is greater than from about 15 to less than about 100, or from about 40 to about 95. Acid value can be measured by methods known to one of skill in the art, such as ASTM standard test method ASTM D 974.

In embodiments, the radiation curable solid ink composition contains a non-curable wax comprising an ester wax having a melting point of from about 40 to about 95° C.

The non-curable wax can be present in any suitable amount. In embodiments, the non-curable wax can be present in an amount of from about 15 percent to about 55 percent, or from about 25 percent to about 50 percent, or from about 30 percent to about 45 percent, by weight based upon the total weight of the curable solid ink composition.

Photoinitiators

The radiation-curable solid ink composition may optionally include an initiator, such as, for example, a photoinitiator. In embodiments, such an initiator is desirable for assisting in curing of the ink.

In embodiments, a photoinitiator that absorbs radiation, for example UV light radiation, to initiate curing of the curable components of the ink may be used. As the photoinitiator for ink compositions of embodiments that are cured by free-radical polymerization, for instance, ink compositions containing acrylate groups or inks comprised of polyamides, mention may be made of photoinitiators such as benzophenones, benzoin ethers, benzil ketals, α-hydroxyalkylphenones, α-alkoxyalkylphenones α-aminoalkylphenones and acylphosphine photoinitiators sold under the trade designations of IRGACURE and DAROCUR from Ciba. Specific examples of suitable photoinitiators include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); 2-isopropylthioxanthone and 2-isopropylthioxanthone (available as Ciba Darocur ITX); α-hydroxy ketone photoinitiator comprising 1-hydroxy-cyclohexyl-phenyl-ketone (available as Ciba IRGACURE 184); bis(2,4,6-trimethylbenzoyl)-phenyl-phosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methyl-propan-1-one (available as Ciba IRGACURE 2959); 2-benzyl 2-dimethylamino 1-(4-morpholinophenyl) butanone-1 (available as Ciba IRGACURE 369); 2-hydroxy-1-(4-(4-(2-hydroxy-2-methylpropionyl)-benzyl)-phenyl)-2-methylpropan-1-one (available as Ciba IRGACURE 127); 2-dimethylamino-2-(4-methylbenzyl)-1-(4-morpholin-4-ylphenyl)-butanone (available as Ciba IRGACURE 379); titanocenes; isopropylthioxanthone; 1-hydroxy-cyclohexylphenylketone; benzophenone; 2,4,6-trimethylbenzophenone; 4-methylbenzophenone; diphenyl-(2,4,6-trimethylbenzoyl) phosphine oxide; 2,4,6-trimethylbenzoylphenylphosphinic acid ethyl ester; oligo (2-hydroxy-2-methyl-1-(4-(1-methylvinyl)phenyl) propanone); 2-hydroxy-2-methyl-1-phenyl-1-propanone; benzyl-dimethylketal; and mixtures thereof. Mention may also be made of amine synergists, i.e., co-initiators that donate a hydrogen atom to a photoinitiator and thereby form a radical species that initiates polymerization (amine synergists can also consume oxygen dissolved in the ink—as oxygen inhibits free-radical polymerization its consumption increases the speed of polymerization), for example such as ethyl-4-dimethylaminobenzoate and 2-ethylhexyl-4-dimethylamino-benzoate. This list is not exhaustive, and any known photoinitiator that initiates the free-radical reaction upon exposure to a desired wavelength of radiation such as UV light can be used without limitation.

In embodiments, the photoinitiator may absorb radiation of about 200 to about 420 nm wavelengths in order to initiate cure, although use of initiators that absorb at longer wavelengths, such as the titanocenes that may absorb up to 560 nm, can also be used without restriction.

The total amount of initiator included in the ink composition may be from, for example, about 3 percent to about 20 percent by weight, such as from about 4 percent to about 10 percent by weight, of the ink composition.

Colorants

The ink compositions may optionally contain a colorant. Any desired or effective colorant can be employed in the ink compositions, including dyes, pigments, mixtures thereof, and the like, provided that the colorant can be dissolved or dispersed in the ink vehicle. Pigments, which are typically cheaper and more robust than dyes, may be included in particular embodiments. The color of many dyes can be altered by the polymerization process occurring during the curing stage, presumably from attack of their molecular structure by the free radicals. The compositions can be used in combination with conventional ink-colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon Red 492 (BASF); Orasol Red G (Ciba); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bernachrome Yellow GD Sub (Classic Dyestuffs); Cartasol Brilliant Yellow 4GF (Clariant); Cibanon Yellow 2GN (Ciba); Orasol Black CN (Ciba); Savinyl Black RLSN(Clariant); Pyrazol Black BG (Clariant); Morfast Black 101 (Rohm & Haas); Diaazol Black RN (ICI); Orasol Blue GN (Ciba); Savinyl Blue GLS (Clariant); Luxol Fast Blue MBSN (Pylam Products); Sevron Blue 5GMF (Classic Dyestuffs); Basacid Blue 750 (BASF), Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the phase change inks. Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASF); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RF (commercially available from Ciba); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASF); NEOPEN Blue FF4012 (commercially available from BASF); PV Fast Blue B2GO1 (commercially available from Clariant); IRGALITE Blue BCA (commercially available from Ciba); PALIOGEN Blue 6470 (commercially available from BASF); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASF); PALIOTOL Yellow 1840 (commercially available from BASF); NOVOPERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASF); Suco-Yellow L1250 (commercially available from BASF); Suco-Yellow Dl 355 (commercially available from BASF); Suco Fast Yellow Dl 355, Dl 351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degusssa) Carbon Black 5250 and Carbon Black 5750 (commercially available from Columbia Chemical), and the like, as well as mixtures thereof.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

The colorant may be included in the ink composition in an amount of from, for example, about 0.1 percent to about 25 percent by weight of the ink composition, such as about 0.2 percent to about 8 percent by weight of the ink composition.

Antioxidants

The radiation-curable solid ink compositions can also optionally contain an antioxidant. The optional antioxidants of the ink compositions protect the images from oxidation and also protect the ink components from oxidation during the heating portion of the ink preparation process. Specific examples of suitable antioxidant stabilizers include NAUGARD™ 524, NAUGARD™ 635, NAUGARD™ A, NAUGARD™ 1-403, and NAUGARD™ 959, commercially available from Crompton Corporation, Middlebury, Conn.; IRGANOX™ 1010, and IRGASTAB UV 10, commercially available from Ciba Specialty Chemicals; GENORAD 16 and GENORAD 40 commercially available from Rahn AG, Zurich, Switzerland, and the like.

When present, the optional antioxidant is present in the ink compositions of embodiments in any desired or effective amount, such as at least about 10 percent by weight of the ink composition, at least about 5 percent by weight of the ink composition, or at least about 0.25 by weight of the ink composition.

Optional Additives

The inks of embodiments may be mixtures of curable components and, optionally, additional materials including reactive diluents, colorants, initiating agents, antioxidants, as well as any conventional optional additives. Such conventional additives may include, for example, defoamers, slip and leveling agents, pigment dispersants, etc. The inks may also include additional monomeric or polymeric materials as desired.

Embodiments of the radiation-curable solid ink composition disclosed may also optionally include an amide gellant. Any suitable amide gellant maybe used. Exemplary amide gellants are described in U.S. Pat. No. 7,279,587, having the formula

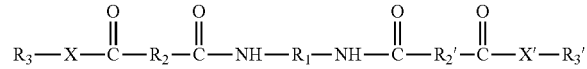

wherein:

$R_1$ is:

(i) an alkylene group (wherein an alkylene group is a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from about 1 carbon atom to about 12 carbon atoms, such as from about 1 carbon atom to about 8 carbon atoms or from about 1 carbon atom to about 5 carbon atoms, (ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 carbon atom to about 15 carbon atoms, such as from about 3 carbon atoms to about 10 carbon atoms or from about 5 carbon atoms to about 8 carbon atoms, (iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 carbon atoms to about 32 carbon atoms, such as from about 6 carbon atoms to about 22 carbon atoms or from about 6 carbon atoms to about 12 carbon atoms, or (iv) an alkylarylene group (wherein an alkylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 carbon atoms to about 32 carbon atoms, such as from about 6 carbon atoms to about 22 carbon atoms or from about 7 carbon atoms to about 15 carbon atoms, wherein the substituents on the substituted alkylene, arylene, arylalkylene, and alkylarylene groups can be (but are not limited to) halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:

(i) alkylene groups having from about 1 carbon atom to about 54 carbon atoms, such as from about 1 carbon atom to about 48 carbon atoms or from about 1 carbon atom to about 36 carbon atoms, (ii) arylene groups having from about 5 carbon atoms to about 15 carbon atoms, such as from about 5 carbon atoms to about 13 carbon atoms or from about 5 carbon atoms to about 10 carbon atoms, (iii) arylalkylene groups having from about 6 carbon atoms to about 32 carbon atoms, such as from about 7 carbon atoms to about 33 carbon atoms or from about 8 carbon atoms to about 15 carbon atoms, or (iv) alkylarylene groups having from about 6 carbon atoms to about 32 carbon atoms, such as from about 6 carbon atoms to about 22 carbon atoms or from about 7 carbon atoms to about 15 carbon atoms, wherein the substituents on the substituted alkylene, arylene, arylalkylene, and alkylarylene groups may be halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, and wherein two or more substituents may be joined together to form a ring;

$R_3$ and $R_3'$ each, independently of the other, are either:

(a) photoinitiating groups, such as groups derived from 1-(4-(2-hydroxyethoxy)phenyl)-2-hydroxy-2-methylpropan-1-one, of the formula

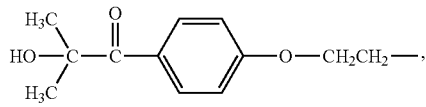

groups derived from 1-hydroxycyclohexylphenylketone, of the formula

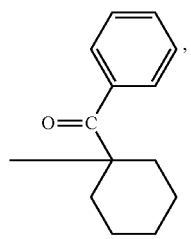

groups derived from 2-hydroxy-2-methyl-1-phenylpropan-1-one, of the formula

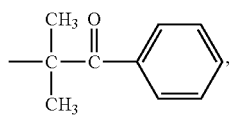

groups derived from N,N-dimethylethanolamine or N,N-dimethylethylenediamine, of the formula

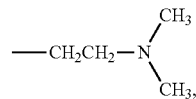

or the like, or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group) having from about 2 carbon atoms to about 100 carbon atoms, such as from about 3 carbon atoms to about 60 carbon atoms or from about 4 carbon atoms to about 30 carbon atoms, (ii) an aryl group (including substituted and unsubstituted aryl groups, and wherein heteroatoms, such as oxygen, nitrogen, sulfur, silicon, phosphorus, boron, and the like either may or may not be present in the aryl group) having from about 5 carbon atoms to about 100 carbon atoms, such as from about 5 carbon atoms to about 60 carbon atoms or from about 6 carbon atoms to about 30 carbon atoms, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group) having from about 5 carbon atoms to about 100 carbon atoms, such as from about 5 carbon atoms to about 60 carbon atoms or from about 6 carbon atoms to about 30 carbon atoms, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group) having from about 5 carbon atoms to about 100 carbon atoms, such as from about 5 carbon atoms to about 60 carbon atoms or from about 6 carbon atoms to about 30 carbon atoms, such as tolyl or the like, wherein the substituents on the substituted alkyl, arylalkyl, and alkylaryl groups may be halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring;

and X and X' each, independently of the other, is an oxygen atom or a group of the formula $-NR_4-$, wherein $R_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, having from about 5 carbon atoms to about 100 carbon atoms, such as from about 5 carbon atoms to about 60 carbon atoms or from about 6 carbon atoms to about 30 carbon atoms, (iii) an aryl group, including substituted and unsubstituted aryl groups, and wherein heteroatoms either may or may not be present in the aryl group, having from about 5 carbon atoms to about 100 carbon atoms, such as from about 5 carbon atoms to about 60 carbon atoms or from about 6 carbon atoms to about 30 carbon atoms, (iv) an arylalkyl group, including substituted and unsubstituted arylalkyl groups, wherein the alkyl portion of the arylalkyl group may be linear or branched, saturated or unsaturated, and cyclic or acyclic, and wherein heteroatoms either may or may not be present in either the aryl or the alkyl portion of the arylalkyl group, having from about 5 carbon atoms to about 100 carbon atoms, such as from about 5 carbon atoms to about 60 carbon atoms or from about 6 carbon atoms to about 30 carbon atoms, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from about 5 carbon atoms to about 100 carbon atoms, such as from about 5 carbon atoms to about 60 carbon atoms or from about 6 carbon atoms to about 30 carbon atoms, wherein the substituents on the substituted alkyl, aryl, arylalkyl, and alkylaryl groups may be halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring.

Specific suitable substituents and gellants of the above are further set forth in U.S. Pat. Nos. 7,279,587 and 7,276,614, incorporated herein by reference in their entireties, and thus are not further detailed herein.

In embodiments, the gellant may comprise a mixture comprising:

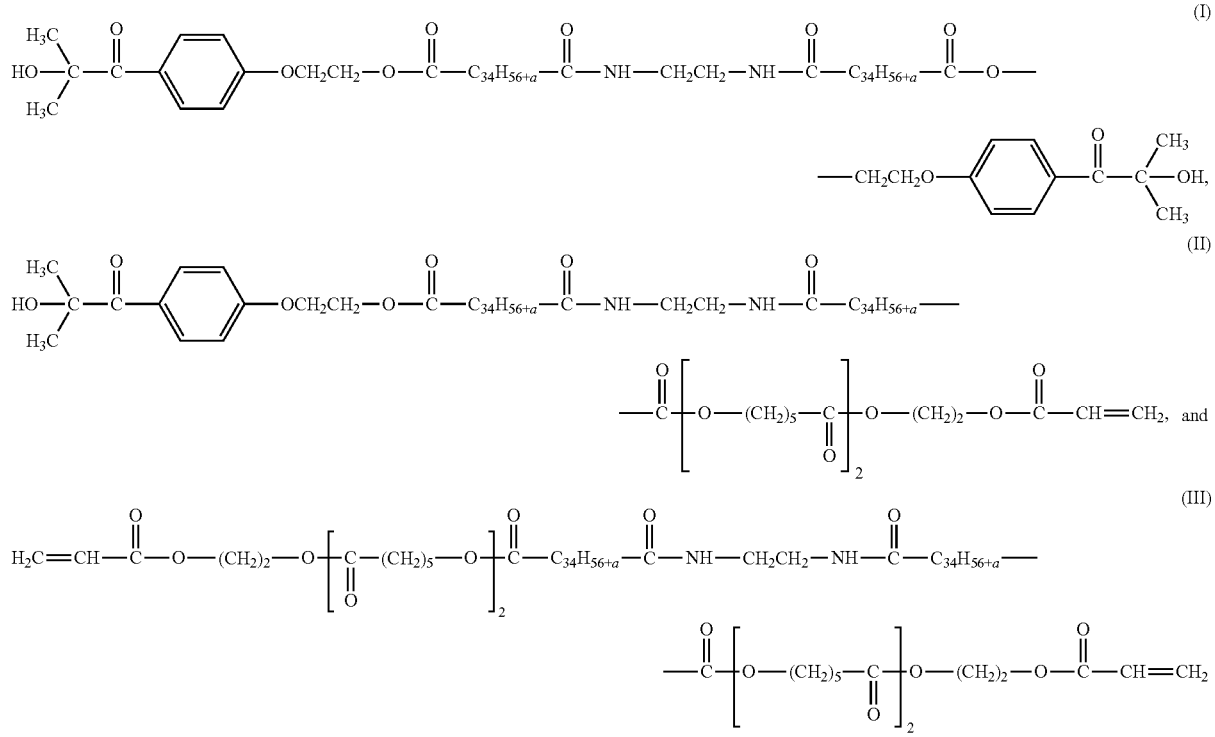

wherein —$C_{34}H_{56+a}$— represents a branched alkylene group which may include unsaturations and cyclic groups, wherein the variable "a" is an integer from 0-12.

When present, the optional amide gellant is present in the ink compositions of embodiments in any desired or effective amount, such as at least about 15 percent by weight of the ink composition, at least about 5 percent by weight of the ink composition, or at least about 0.1 by weight of the ink composition.

Ink Composition Preparation and Use

The radiation-curable solid inks of embodiments may be prepared by any suitable technique. As an example, the inks may be prepared by first combining the curable components, which may be less than about 85% by weight and greater than about 35% by weight of the ink composition, adding the non-curable components, which may be less than about 55% by weight and greater than about 15% by weight, adding the photoinitiator, which may be less than about 6.5% by weight and greater than about 3.5% by weight, optionally adding any additives, such as, for example, a gellant, and adding pigment. Heating the mixture to obtain a homogenous mixture. The ink composition may then be filtered, optionally at an elevated temperature, through a filter to remove extraneous large particles and/or dust particles. The method of preparation for the ink compositions may be modified so as to accommodate the type of components used for the preparation of the ink compositions.

The ink compositions described herein may be jetted at temperatures of less than about 100° C., such as from about 70° C. to about 100° C. or from about 80° C. to about 90° C., or about 85° C. The ink compositions are thus ideally suited for use in piezoelectric ink jet devices.

The ink compositions can also be employed in indirect (offset) printing ink jet applications, wherein when droplets of the melted ink are ejected in an imagewise pattern onto a recording substrate, the recording substrate is an intermediate-transfer member and the ink in the imagewise pattern is subsequently transferred from the intermediate-transfer member to a final recording substrate.

The ink compositions are suited for jetting onto an intermediate-transfer substrate, for instance, an intermediate-transfuse drum or belt. In a suitable design, the image may be applied by jetting appropriately colored ink compositions during, for instance, four to eighteen rotations (incremental movements) of the intermediate-transfuse member with respect to the ink-jet head, in other words, there is a small translation of the printhead with respect to the substrate in between each rotation. This approach simplifies the printhead design, and the small movements ensure good droplet registration. Transfuse, or a transfer and fusing step, is desirable in forming the image as transfuse enables a high quality image to be built up on a rapidly rotating transfer member. Transfuse typically involves jetting the ink composition from the ink-jet head onto an intermediate-transfer member such as a belt or drum, such as the transfuse member. This allows the image to be rapidly built onto the transfuse member for subsequent transfer and fusing to an image-receiving substrate. Alternatively, the same image build-up can be carried out directly on the image substrate, for example, paper.

The intermediate-transfer member may take any suitable form, such as a drum or belt. The member surface may be at room temperature, although in embodiments the member may be heated to have a surface temperature that is, for example, within the solid-state temperature range for the ink composition. For example, the surface may be maintained at a temperature of about 25 degree C. to about 70 degree C., such as from about 30 degree C. to about 65 degree C., or from about 35 degree C. to about 60 degree C. In this way, the ink is maintained on the surface of the transfer member until transfer to the image receiving substrate. Thus, the ink may be heated to a first temperature at which the ink may be jetted, for instance, above the solid-transition temperature of the ink composition, which first temperature may be, for example, from about 40° C. to about 100° C. The second temperature at which the solid forms is less than the first temperature, for example is from about 25° C. to about 70° C.

The ink compositions described herein may transfuse at temperatures of from about 30° C. to about 60° C., such as from about 30° C. to about 55° C., from about 35° C. to about 50° C., such as about 40° C.

Once upon the intermediate-transfer member surface, the jetted ink composition may be exposed to radiation to a limited extent so as to affect a limited curing of the ink upon the intermediate-transfer member surface. This intermediate curing is not to cure the ink composition to its full extent, but merely to assist in setting the jetted ink so that it may be transferred to the image receiving substrate with the appropriate amount of penetration, which requires the ink droplets to have a certain rheology before transfer. For controlling the extent of the curing if an intermediate cure is practiced, reference is made to co-pending U.S. Application Publication Nos. 2006/0158496 and 2006/0119686, each incorporated herein by reference in its entirety.

Following jetting to the intermediate-transfer member and optional intermediate curing thereon, the ink composition is thereafter transferred to an image receiving substrate. The substrate may be any suitable material such as non-porous flexible food packaging substrates, adhesives for food packaging paper, foil-laminating, fabric, plastic, glass, metal, etc.

Following transfer to the substrate or jetting to the substrate if direct printing is employed, the ink composition is then cured by exposing the image on the substrate to radiation. For example, radiation having an appropriate wavelength, mainly the wavelength at which the ink initiator absorbs radiation, may be used. This initiates the curing reaction of the ink composition. The radiation exposure need not be long, and may occur for example, about 0.05 to about 10 seconds, such as from about 0.2 to about 2 seconds. These exposure times are more often expressed as substrate speeds of the ink composition passing under a UV lamp. For example, the microwave energized, doped mercury bulbs available from UV Fusion are placed in an elliptical mirror assembly that is 10 cm wide; multiple units may be placed in series. Thus, a belt speed of 0.1 $ms^{-1}$ would require 1 second for a point on an image to pass under a single unit, while a belt speed 4.0 $ms^{-1}$ would require 0.2 seconds to pass under four bulb assemblies. The energy source used to initiate crosslinking of the radiation curable components of the composition can be actinic, for example, radiation having a wavelength in the ultraviolet or visible region of the spectrum, accelerated particles, for example, electron beam radiation, thermal, for example, heat or infrared radiation, or the like. In embodiments, the energy is actinic radiation because such energy provides excellent control over the initiation and rate of crosslinking. Suitable sources of actinic radiation include mercury lamps, xenon lamps, carbon arc lamps, tungsten filament lamps, lasers, light emitting diodes, sunlight, electron beam emitters and the like. The curing light may be filtered or focused, if desired or necessary. The curable components of the ink composition react to form a cured or cross-linked network of appropriate hardness and robustness. In embodiments, the curing is substantially complete to complete, i.e., at least 75% of the curable components are cured (reacted and/or cross-linked). This allows the ink composition to be substantially hardened, and thereby to be much more scratch resistant, and also adequately controls the amount of show-through on the substrate.

When an indirect-printing process is used, the intermediate-transfer member can be of any desired or suitable configuration, such as a drum or roller, a belt or web, a flat surface or platen, or the like. The temperature of the intermediate-transfer member can be controlled by any desired or suitable method, such as by situating heaters in or near the intermediate-transfer member, using air flow to cool the transfer member, or the like. Optionally, a layer of a sacrificial liquid can be applied to the intermediate-transfer member prior to ejecting the droplets of melted ink onto the intermediate-transfer member, whereby the melted ink droplets are ejected onto the sacrificial liquid layer on the intermediate-transfer member, as disclosed in, for example, U.S. Pat. No. 5,389,958. Transfer from the intermediate-transfer member to the final recording substrate can be made by any desired or suitable method, such as by passing the final recording substrate through a nip formed by the intermediate-transfer member and a back member, which can be of any desired or effective configuration, such as a drum or roller, a belt or web, a flat surface or platen, or the like. Transfer can be carried out at any desired or effective nip pressure, for example from about 5 pounds per square inch to about 2,000 pounds per square inch, such as from about 10 to about 200 pounds per square inch. The transfer surface may be hard or soft and compliant. Subsequent to transfer, the image on the substrate is cured. The radiation to cure the photo-polymerizable components of the ink composition may be provided by a variety of possible techniques, including but not limited to a xenon lamp, laser light, medium pressure mercury lamps, micro-wave excited mercury lamps often known as a H bulb, doped mercury lamps often referred to as D or V bulbs, LED etc. Without being limited to any specific theory, it is believed that in this embodiment, the ink composition is transferred to the final recording substrate in a semi-solid state, facilitating penetration of the ink composition into the final substrate (paper fibers, for example) and enabling improved adhesion, reduced show-through, and reduced pile height.

The inks described herein may be applied to a substrate to form an image. In embodiments, the method comprises providing a curable solid ink composition described herein at a first temperature; applying, such as jetting, the radiation curable ink to the substrate in an imagewise fashion to form an image, the substrate being at a second temperature, which is below the first temperature; and exposing the radiation curable ink to radiation to cure the ink. During the curing process, the curable monomer and the curable wax, optionally with other curable components, such as the optional curable oligomer, are polymerized to form a cured image.

However, the substrate to which the inks are applied could be at a temperature at which the ink has a higher viscosity, such as a viscosity of from $10^2$ to $10^7$ mPa-s. For example, the substrate may be maintained at a temperature of about 80° C. or below, more specifically from about 0° C. to 50° C., provided the temperature of the substrate is less than the jetting temperature. In a specific embodiment, the substrate temperature is at least 10° C. below the first temperature or the substrate temperature is from 10 to 50° C. below the jetting temperature.

By jetting the ink at a temperature at which the ink is a liquid and having the substrate at the temperature at which the ink has a higher viscosity, a phase change can be provided. This phase change may prevent the composition from rapidly soaking into the substrate, avoiding or at least minimizing showthrough. In addition, the ink while on the substrate is exposed to radiation to initiate polymerization of the curable monomer, leading to a robust image. In specific embodiments, the ink compositions can be employed in apparatus for direct printing ink jet processes, wherein when droplets of the melted ink are ejected in an imagewise pattern onto a recording substrate and the recording substrate is a final recording substrate, for example, direct to paper applications, although the substrate is not limited to paper. The substrate may be any suitable material such as paper, boxboard, cardboard, fabric, a transparency, plastic, glass, wood etc., although the ink is most specifically used in forming images on paper.

The following examples of radiation-curable solid ink compositions further illustrate the foregoing embodiments. These Examples are illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Colorless curable solid inks were formulated with the component amounts in grams shown in Table 1 as follows: into a 30 mL amber glass bottle, were added the ink components in the following order: CD406, SR368, CD587, Unilin 350 Acrylate, Licowax KFO, Irgacure 819, Irgacure 184, Irgacure 907 and for selected samples Darocur ITX. To this mixture was added a stir bar and the mixture was placed in a Variomag reaction block. The ink mixture was heated and stirred at ~90° C., and 300 RPM respectively for at least 20 minutes or until the mixture appeared homogeneous. The temperature was increased to 100° C. for ~5 minutes. The mixture was brought back down to 90° C. and left to stir for 90 minutes.

TABLE 1

| Component | A | B | C | D | E | F | G | H | I |
|---|---|---|---|---|---|---|---|---|---|
| CD406 | 4.740 | 6.000 | 2.945 | 3.234 | 2.945 | 3.174 | 3.174 | 3.174 | 2.234 |
| SR368 | 0.700 | 0.700 | 0.229 | 0.251 | 0.229 | 0.000 | 0.000 | 0.000 | 0.000 |
| CD587 | 0.000 | 0.000 | 1.794 | 1.970 | 1.794 | 1.794 | 1.794 | 1.794 | 1.534 |
| PP-U350a-1 | 0.000 | 0.000 | 0.850 | 0.000 | 0.850 | 0.850 | 0.850 | 0.850 | 0.850 |
| Licowax KFO | 4.000 | 2.740 | 3.688 | 4.050 | 2.889 | 3.688 | 3.488 | 3.288 | 4.888 |
| Amide Gellant | 0.000 | 0.000 | 0.000 | 0.000 | 0.000 | 0.000 | 0.200 | 0.400 | 0.000 |
| I819 | 0.000 | 0.000 | 0.160 | 0.160 | 0.160 | 0.160 | 0.160 | 0.160 | 0.160 |
| I184 | 0.000 | 0.000 | 0.231 | 0.231 | 0.231 | 0.231 | 0.231 | 0.231 | 0.231 |
| I907 | 0.510 | 0.510 | 0.103 | 0.103 | 0.103 | 0.103 | 0.103 | 0.103 | 0.103 |
| ITX | 0.050 | 0.050 | 0.000 | 0.000 | 0.000 | 0.000 | 0.000 | 0.000 | 0.000 |
| Total | 10.00 | 10.00 | 10.00 | 10.00 | 10.00 | 10.00 | 10.00 | 10.00 | 10.00 |

The pre-cure or initial hardness, curing rate (initial slope), hardness after cure (final hardness), viscosity and volume contraction data were obtained for all of the inks. The results are shown in Table 2. The pre- and post-cure hardness of the ink vehicle candidates were obtained with a PTC Durometer Model PS 6400-0-29001 utilizing a Model 476 Stand and with standard 1 Kg load. The hardness of a commercially available solid ink (Color Qube™ 9200 Series solid ink) was measured as 67 on this instrument.

The cure rate was measured using the variation of hardness vs. UV light exposure. A Fusion UV Systems Inc. Lighthammer equipped with a D-bulb was used to irradiate the vehicles and hardness was measured after specific exposure times. The hardness vs. cure speed (sift) plot was used to obtain the initial curing rate for the ink vehicle. In Table 2, the initial hardness, initial slope (curing rate) and final hardness were obtained from hardness versus exposure time plots using the following expressions: $y = m_1 + m_2 \cdot (1 - \exp(-m_3 \cdot x))$, where $m_1$ is the initial hardness (pre-cured); $m_2 \cdot m_3$ is the initial slope (curing rate) and $m_1 + m_2$ if the final hardness (post-cured hardness). The viscosity was obtained on a Rheometrics Fluid Rheometer RFS3. The volume contraction or shrinkage was measured by pouring about 6.7 mL of molten ink into a copper mold of 35 mm in diameter and 7 mm in height. The ink was left to cool for a minimum of 12 hours and the shrinkage determined from the diameter of the solidified ink and of the mold, making the assumption the shrinkage in the y- and x-direction (height) are the same.

TABLE 2

|   | Initial Hardness | Initial Slope | Final Hardness | Viscosity (cPs) at 90° C. | Volume Contraction (%) |
|---|---|---|---|---|---|
| A | 50.38 | 26.24 | 74.30 | 13.35 | 1.348 |
| B | 48.48 | 84.47 | 68.10 | 11.52 | 0.904 |
| C | 47.00 | 63.09 | 80.70 | 10.04 | 6.149 |
| D | 46.18 | 44.59 | 75.40 | NMR | NMR |
| E | 44.90 | 58.18 | 79.90 | NMR | NMR |
| F | 50.78 | 46.20 | 82.30 | 9.62 | 5.596 |
| G | 45.62 | 65.16 | 81.30 | 10.90 | 3.754 |
| H | 43.66 | 65.34 | 80.80 | 10.90 | 3.333 |
| I | 57.20 | 40.26 | 80.80 | 14.40 | 3.261 |

NMR = No Measurement Recorded

The pre-cure or initial hardness of all the samples was found to be greater than 40, the curing rate ranged from about 25 to >80, and the final hardness was in all cases greater than the hardness of standard solid inks. In addition, since the inks contain a low concentration of crystalline waxes, it was found that the shrinkage upon cooling from jetting temperature was less than 6% in most Examples; this is about 50% less than standard solid inks. In Examples A and B, the shrinkage was less than 1.5%. This will enable vast improvements, or even elimination, of the current maintenance cycle.

Ink of Example F was selected for further printing and transfuse evaluation in a modified Xerox Phaser 8400 printer. About 120 g of this ink was formulated in the manner described above for the smaller ink samples but this time a colorant was added to the formulation, as shown in Table 3.

TABLE 3

| Component | Amount (g) | Weight % |
|---|---|---|
| CD406 | 37.326 | 31.105 |
| CD587 | 21.097 | 17.581 |
| PP-U350a-1 | 9.996 | 8.330 |
| Licowax KFO | 43.371 | 36.142 |
| I819 | 1.882 | 1.568 |
| I184 | 2.717 | 2.264 |
| I907 | 1.211 | 1.009 |
| Blue Olefin Dye | 2.400 | 2.000 |
| Total | 120.000 | 100.000 |

The ink of Example F was evaluated on a Buzz 1 fixture (Frequency=36 Khz, Set jetting T=99.6° C.; 355×464 dpi) on CX paper. The following transfix conditions were used: Drum=35° C.; Preheat=50° C.; Pressure=385 lbs; Speed=20 ips. The transfix was also evaluated with respect to delay time after printing on transfix drum.

The transfix properties were found to improve with increase in the delay time between the printing and transfuse step. After a 30 s delay the residual ink on drum (as evidenced by transfer to a chase sheet) was much less than with no delay and acceptable. Optimum performance at zero delay time is expected through further optimization of the ink formulation and of the transfuse conditions, pressure and temperature.

The ink of Example F was also printed direct to paper. Both the transfused image and direct-to-paper printed images were cured with a Fusion UV Systems Inc. Lighthammer equipped with a D-bulb at speeds ranging from 32 to 240 ft/min, Cured images do not smear and the transfuse images have excellent scratch resistance, as a result of the better penetration of the ink in the paper under pressure and of the curing process which increases the hardness of the ink to a level higher than standard solid inks as mentioned earlier.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A radiation curable solid ink composition, comprising:
   an ink vehicle; and
   a curable wax; and
   a non-curable ester wax in an amount of from about 15 percent to about 55 percent by weight based upon the total weight of the radiation curable solid ink composition, wherein
   the radiation curable solid ink composition has an initial hardness greater than 40 at room temperature.

2. The radiation curable solid ink composition of claim 1, wherein the initial hardness is from 40 to about 70 at room temperature.

3. The radiation curable solid ink composition of claim 1, wherein the initial hardness is about 45 to about 55 at room temperature.

4. The radiation curable solid ink composition of claim 1, wherein the transfuse temperature is from about 30 to about 60° C.

5. The radiation curable solid ink composition of claim 4, wherein the transfuse temperature is about 35 to 50° C.

6. The radiation curable solid ink composition of claim 1, wherein the volume contraction upon cooling from the melt is from about 1.5% to about 7.0%.

7. The radiation curable solid ink composition of claim 6, wherein the volume contraction upon cooling from the melt is less than 5%.

8. The radiation curable solid ink composition of claim 1, wherein the radiation curable solid ink composition has a jetting temperature from about 70 to about 100° C.

9. The radiation curable solid ink composition of claim 8, wherein the radiation curable solid ink composition has a jetting temperature of about 85 to 100° C.

10. The radiation curable solid ink composition of claim 1, wherein the curable wax is an acrylate wax having a melting point from about 50 to about 90° C.

11. The radiation curable solid ink composition of claim 1, wherein the non-curable ester wax has an acid value (mg KOH/g) that is greater than from about 15 to less than about 100.

12. The radiation curable solid ink composition of claim 1, wherein the ink vehicle comprises a curable monomer and a free-radical photoinitiator.

13. The radiation curable solid ink composition of claim 12, wherein the curable monomer is one or more selected from the group consisting of difunctional cycloaliphatic acrylate monomers, trifunctional monomers, acrylate esters, and mixtures thereof.

14. The radiation curable solid ink composition of claim 12, wherein the free-radical photoinitiator is one or more selected from the group consisting of 2-isopropylthioxanthone and 2-isopropylthioxanthone; α-hydroxy ketone photoinitiator comprising 1-hydroxy-cyclohexyl-phenyl-ketone; bis(2,4,6-trimethylbenzoyl)-phenyl-phosphine oxide; and 2-methyl-1-(4-methylthio)phenyl-2(4-morphorlinyl)-1-propanone.

15. The radiation curable solid ink composition of claim 12, wherein the radiation curable solid ink further comprises a pigment.

16. The radiation curable solid ink composition of claim 12, wherein the ink vehicle further comprises an amide gellant.

17. A radiation curable solid ink composition, comprising:
an ink vehicle;
a curable wax;
a non-curable ester wax in an amount of from about 15 percent to about 55 percent by weight based upon the total weight of the radiation curable solid ink composition;
curable monomers;
a photoinitiator; and
a pigment, wherein
the ink composition has
an initial hardness greater than 40 at room temperature,
a transfuse temperature from about 30 to about 60° C., and
a jetting temperature from about 70 to about 100° C.

18. An ink printing device comprising:
a radiation curable solid ink composition for printing onto a substrate;
an ink jetting device;
a transfuse member; and
a radiation curing device which cures the jetted radiation curable ink, wherein the ink composition comprises
an ink vehicle,
a non-curable ester wax in an amount of from about 15 percent to about 55 percent by weight based upon the total weight of the ink composition, and
a curable wax, and
the ink composition has an initial hardness greater than 40 at room temperature.

19. The ink printing device of claim 18, wherein the ink jetting device jets the ink at a temperature from about 70 to about 100° C.

20. The ink printing device of claim 18, wherein the transfuse member is heated to a temperature from about 30 to about 60° C.

* * * * *